United States Patent [19]
Greacen

[11] 3,900,939
[45] Aug. 26, 1975

[54] METHOD OF PLUGGING STEAM GENERATOR TUBES

[75] Inventor: John Stuart Greacen, West Hartford, Conn.

[73] Assignee: Combustion Engineering, Inc., Windsor, Conn.

[22] Filed: Oct. 31, 1973

[21] Appl. No.: 411,562

[52] U.S. Cl. .................. 29/401; 29/447; 138/89; 148/11.5 R; 403/273
[51] Int. Cl..... B22d 19/10; B23p 7/00; B23p 11/02
[58] Field of Search ... 29/447, 157.4, 401, DIG. 35; 285/381; 403/273; 75/128 T; 138/89; 148/11.5 R

[56] References Cited
UNITED STATES PATENTS

| | | | |
|---|---|---|---|
| 2,647,847 | 8/1953 | Black et al. | 29/447 |
| 3,555,656 | 1/1971 | Brown et al. | 29/401 |
| 3,558,369 | 1/1971 | Wang et al. | 148/11.5 R |
| 3,579,805 | 5/1971 | Kast | 29/447 |
| 3,590,877 | 7/1971 | Leopold | 138/89 |
| 3,805,567 | 4/1974 | Agius-Sinerco | 29/447 X |

OTHER PUBLICATIONS

55 Nitinol – The Alloy with a Memory: Its Physical Metallurgy Properties and Applications: by C. M. Jackson et al., Published by Technology Utilization Office, National Aeronautics and Space Adm., Washington, D.C. – pp. 77–79.

*Primary Examiner*—Charlie T. Moon

[57] ABSTRACT

A method for plugging the ends of defective tubes in shell and tube heat exchangers is described. The plug utilized in the method is fabricated from a metallic alloy having a mechanical memory characteristic whereby it can be physically deformed into a reduced diameter for insertion into the tube end and thereafter induced to assume its original diameter to thus secure the plug within the tube.

5 Claims, 5 Drawing Figures

PATENTED AUG 26 1975  3,900,939

METHOD OF PLUGGING STEAM GENERATOR TUBES

BACKGROUND OF THE INVENTION

Shell and tube heat exchangers are commonly employed for the indirect transfer of heat between two fluids. They comprise a plurality of closely spaced tubes whose ends are secured to a tube sheet within a pressure shell in which one of the fluids is passed through the interior of the tubes while the other circulates through the shell about the tubes. In such apparatus it is commonly desirable to prevent intermixture of the fluids as may occur in the event of failure of one or more of the tubes. It is further desirable, when leaks occur, to expend as little time as possible in correcting the problem in order that the down time of the apparatus will be minimal. For this reason, it is common practice not to replace or repair any defective tubes in such heat exchangers but instead to design them with an excessive amount of heating surface and to simply plug any defective tube at both ends thereby to avoid the necessity of having to remove the apparatus from service for the extended periods of time required to dismantle the shell and tube bundle in order to replace or otherwise repair a defective tube.

Many solutions have been offered for plugging such defective tubes. These have involved the application of mechanically expanded plugs, or alternatively, plugs that may be weldedly secured to the tube ends by conventional or explosive means. Such solutions are not totally corrective of the problem. Both of the aforementioned types of plugs undesirably require considerable time to apply. Moreover, mechanically expandable plugs are further undesirable in that they are inherently deficient in maintaining a leak-proof joint over extended periods of time. Explosively welded plugs, on the other hand, are undesirable for the reason that the energy input to effect the weld can damage the tube sheet between adjacent tubes or the tube-to-tube sheet joints therebetween.

It has further been considered to apply the plugs to the tubes by cooling the plug such that its diameter is sufficiently contracted to be received within the affected tube whereupon returning the plug to ambient temperature causes it to thermally expand to a tight fit within the tube. While this mode of plug application can be utilized in units employing large diameter tubes, its use is impractical in shell and tube heat exchangers such as those which serve as steam generators in nuclear power plants for the reason that these apparatus employ tubes having an internal diameter of about five-eighths inch, which dimension precludes the convenient application of the plugs in this manner. Because of such small plug dimensions and because of the prevailing internal diameter tolerances maintained in the fabrication of the tubes it is impossible to utilize this plugging procedure without accurately measuring the internal diameter of each tube to be plugged and thereafter fabricating the plug to be applied to accurate dimensions. Such solution is obviously excessively time consuming and expensive to warrant serious consideration.

SUMMARY OF THE INVENTION

The present invention involves an improved form of tube plug and method for applying the same to the end of a defective tube. The tube plug contemplated for use herein comprises a generally hollow body, typically cylindrical, of material containing from about 53 to 57 percent nickel by weight and the balance being predominantly titanium. This material, commonly known as 55-Nitinol, is described in detail in the publication, *55-Nitinol - The Alloy with a Memory: Its Physical Metallurgy, Properties and Applications* by C. M. Jackson, et al, published by Technology Utilization Office, National Aeronautics and Space Administration, Washington, D. C., 1972. It possesses the unique mechanical property of being capable, under proper conditions, of restoration to its original shape even after being deformed out of that shape by methods that would result in the permanent deformation of other metals. The material is further characterized by the fact that its return to its original shape is accompanied by considerably force capable of performing mechanical work. According to another aspect of the invention there is provided a method of plugging a defective tube by means of a plug formed from the above material comprising the steps of forming the plug with an external diameter greater than the internal diameter of the tube to be plugged; heating the plug to the prescribed temperature for imparting its "memory" configuration; thereafter cooling the same to a temperature below the minimum limit of the transition range of temperatures for the plug material where the plug is imparted with its "intermediate" configuration. Thereafter the plug is applied to the tube to be plugged and heated to a temperature above the upper limit of its transition range whereby the tube is caused to attempt to assume its memory configuration and in so doing is expanded into tight plugging engagement within the tube interior.

For a better understanding of the invention, its operating advantages and the specific objects obtained by its use, reference should be made to the accompanying drawings and description which relate to a preferred embodiment of the invention.

DESCRIPTION OF THE PREFERRED EMBODIMENT

Figure 4:
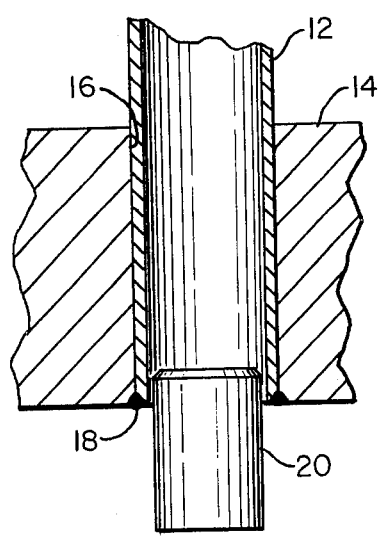
Figure 5:
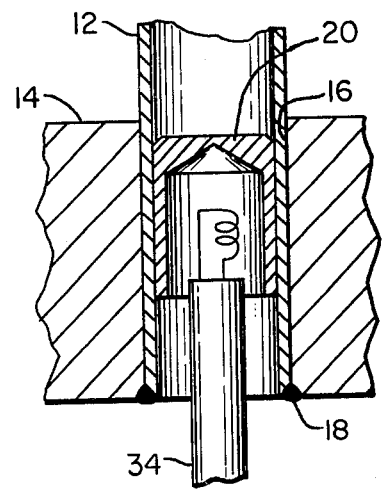

In the drawings there is illustrated a typical connection between the tube 12 and a tube sheet 14 in a conventional shell and tube heat exchanger. As shown in FIGS. 4 and 5 the tube 12 extends through an opening 16 provided in the tube sheet 14 to a position substantially flush with the opposite side thereof. The tube 12 can be radially expanded within the opening 16 to tightly engage the side wall thereof and a circumferential weld 18 may be applied about the exposed end of the tube to render the connection fluid tight.

Figure 1:
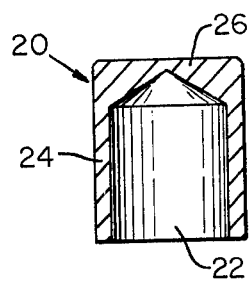
FIG. 1 illustrates a vertical section of a tube plug utilized in the method described herein.
Figure 2:
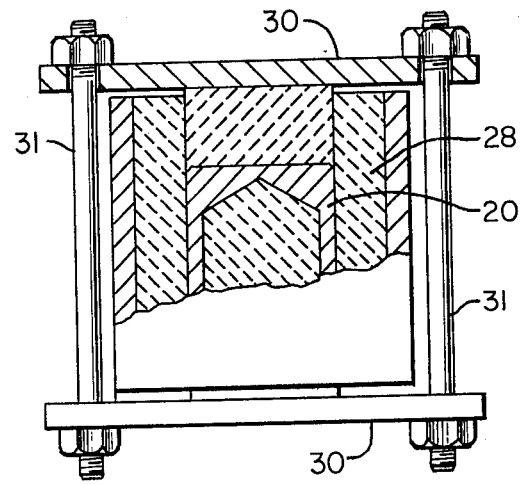
FIGS. 2 through 5 illustrate schematically the various steps utilized in the performance of the invention.

FIG. 1 of the drawing depicts a typical form of tube plug 20 contemplated for use in the present invention. The plug 20 is formed from the material, 55-Nitinol, a metallic alloy based on the intermetallic compound NiTi having a chemical composition in the range of about 53 to 57 weight percent nickel and the balance predominantly titanium. The plug 20 is fabricated as a cylindrical body having a hollow interior body 22 defined by an annular skirt portion 24 and an end closure 26. The thickness of the end closure 26 is designed to be sufficient to withstand the maximum differential pressure to which the plug 20 will be subjected when installed in the end of a defective tube.

In the performance of the method of the present invention for plugging a defective tube the plug is first fabricated by any of several fabrication operations, such as casting, forging, or the like, to provide the plug with an outside diameter greater than the maximum internal diameter to be encountered in a typical tube, taking into consideration allowable tolerances in the manufacture of the tube. It may be desirable to machine the exterior of the plug in order to provide the same with a smooth surface. After machining, however, the finished plug must retain an outside diameter greater than the internal diameter of the tube. It is contemplated for present purposes to size the plug with an outside diameter that is from 1 to 2 percent greater than the nominal internal diameter of the tube to be plugged.

Next the plug 20 is imparted with its memory configuration, or that shape which it will ultimately inherently assume following a processing described hereinafter that includes changing its physical dimensions. This step includes placing the plug 20 in a fixture intended to restrain the plug material against changing its physical dimensions as the temperature of the material is raised to impart the memory configuration. The fixture, which may take any of several forms, is represented in the drawing by apparatus including relatively incompressible bodies 28 formed of ceramic material, such as alumina, silicon carbide, or the like, and placed between pressure plates 30 that are held in compression by tie rods 31. While in the fixture the plug 20 is heated to a temperature from about 900° to 930°F. The function of the fixture is to restrain the plug against elongation or expansion when it is subjected to the aforementioned elevated temperature. After holding the plug in this temperature for about 30 minutes it is slow cooled, either by still air or by furnace cooling, to ambient temperature.

The plug 20 is next cooled to a temperature at which deformation to an intermediate configuration can be undertaken. This temperature is below the minimum limit of the "transitional" range of temperature for the particular alloy of which the plug is formed. The transitional range of temperatures is that range of temperatures through which the material, 55-Nitinol, must pass in order to recover its original or memory configuration. The particular alloy of 55-Nitinol selected for use in the present application is one whose lower transitional range limit is below the lowest conceivable service temperature for the affected heat exchanger. The plug 20 is thus preferably formed of an alloy of 55-Nitinol possessing a transitional range whose lower limit is about 0°F.

Figure 3:
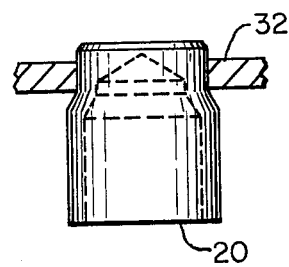

Next the plug 20 is provided with its intermediate configuration. This step involves maintaining the metal temperature of the plug 20 below the lower limit of its transitional range while operating on the plug to reduce its outside diameter to a dimension that will permit it to be readily inserted into the tube 12 to be plugged. The operation employed for this purpose must be one involving straining the material to its desirable dimension. Thus the plug can be imparted with its intermediate configuration by a cold working operation such as by means of swaging dies or by a cold drawing procedure as illustrated schematically by the die 32 in FIG. 3.

After the plug 20 has been provided with its intermediate configuration it is ready for insertion into the tube 12 to be plugged. It is necessary, however, in order for the plug 20 to retain its intermediate configuration, to maintain its temperature below the lower limit of its transitional range. Thus, plug 20 is transferred in its cold condition to the tube 12 to be plugged and is inserted therein (in FIG. 4) to a convenient position for final setting. Thereafter the plug 20 is heated (FIG. 5) as by means of induction heater 34 or the like to a temperature above the upper limit of its transitional range. For most practical purposes this temperature will be of the order of 275°F. Upon heating to this prescribed temperature the plug 20 will inherently attempt to revert to its memory configuration. Because the outside diameter of the plug in its memory configuration is greater than the inner diameter of the tube 12 the plug will be expanded into tight engagement with the tube wall. The mechanical stress produced in the plug by the constraining tube produces an expansion force between the two members to retain the plug within the tube and in sealing engagement therewith.

There is thus described a simple, effective method for plugging heat exchange tubes in a minimal amount of time thereby keeping down time of the heat exchanger to a minimum. The described method is particularly effective in plugging tubes in nuclear steam generators, or the like, in which normal service temperatures are about 650°F using a material whose memory temperature is about 900°F and, therefore, well above the said service temperature of the apparatus. Although the described procedure involves the processing and application of a single plug it should be appreciated that several plugs can be processed at a time for selective application to several tube ends. Alternatively, a plurality of plugs can be processed up to and including the step of imparting its memory configuration at one station, such as for example, at a facility where the machining and working steps can be conveniently performed. Thereafter the plugs can be transported to the job site for application to the heat exchanger tubes as described above. In this mode of operation it will be necessary to maintain the temperature of the processed plugs below the lower limit of the material's transitional range during shipment and storage.

It should be understood that the description herein is merely illustrative of the invention and that variations and modifications can be made therein without departing from its spirit and scope as recited in the following claims. For example, the method described herein is equally applicable to the application of a cylindrical sleeve to the interior of a tube for the purpose of repairing a fault therein rather than for plugging the same.

What is claimed is:

1. A method of retaining a hollow cylindrical body within the interior of a tube comprising the steps of:
   a. forming a hollow, cylindrical body of a material containing about 53 percent to 57 percent nickel and the balance being predominantly titanium and having an external diameter greater than the internal diameter of the tube to receive the same;
   b. heating said body to a temperature of about 900°F while restraining the same to prevent expansion of its physical dimensions;

c. cooling said body to a temperature below the minimum limit of the transition range of temperatures for said material;
d. reducing the external diameter of said cooled body by a cold deforming operation for a clearance fit with respect to the internal diameter of said tube;
e. inserting said cooled body in said tube; and
f. heating said body to a temperature above the maximum limit of said transition range of temperatures for said material to cause expansion of said body into engagement with said tube.

2. A method of plugging the end of a tube comprising the steps of:
a. forming a cylindrical plug containing from about 53 to 57 percent nickel and the balance being predominantly titanium and having an external diameter greater than the internal diameter of the tube to be plugged;
b. heating said plug to a temperature of about 900°F while restraining the same to prevent expansion of its physical dimensions;
c. cooling said plug to a temperature below the minimum limit of the transition range of temperatures for the plug material;
d. reducing the external diameter of said cooled plug by a cold deforming operation for a clearance fit with respect to said tube to be plugged;
e. inserting said cooled plug in said tube; and
f. heating said plug to a temperature above the maximum limit of said transition range of temperatures for the plug material to cause expansion of said plug into engagement with said tube.

3. The method recited in claim 2 in which said plug is slow cooled to ambient temperature following the step of heating up to 900°F.

4. The method recited in claim 3 in which said plug is cooled to a temperature below about 0°F prior to performing said cold deforming operation.

5. The method recited in claim 3 in which said cold deforming operation comprises swaging the exterior of said plug to a reduced diameter.

* * * * *